Sheet 1. 2 Sheets.

J. Naylor
Bending Tires.

N° 75781.  Patented Mar. 24, 1868 attest
R.T. Campbell
Edw. Schafr

Inventor;
J Naylor
by
Mason, Fenwick & Lawrence.

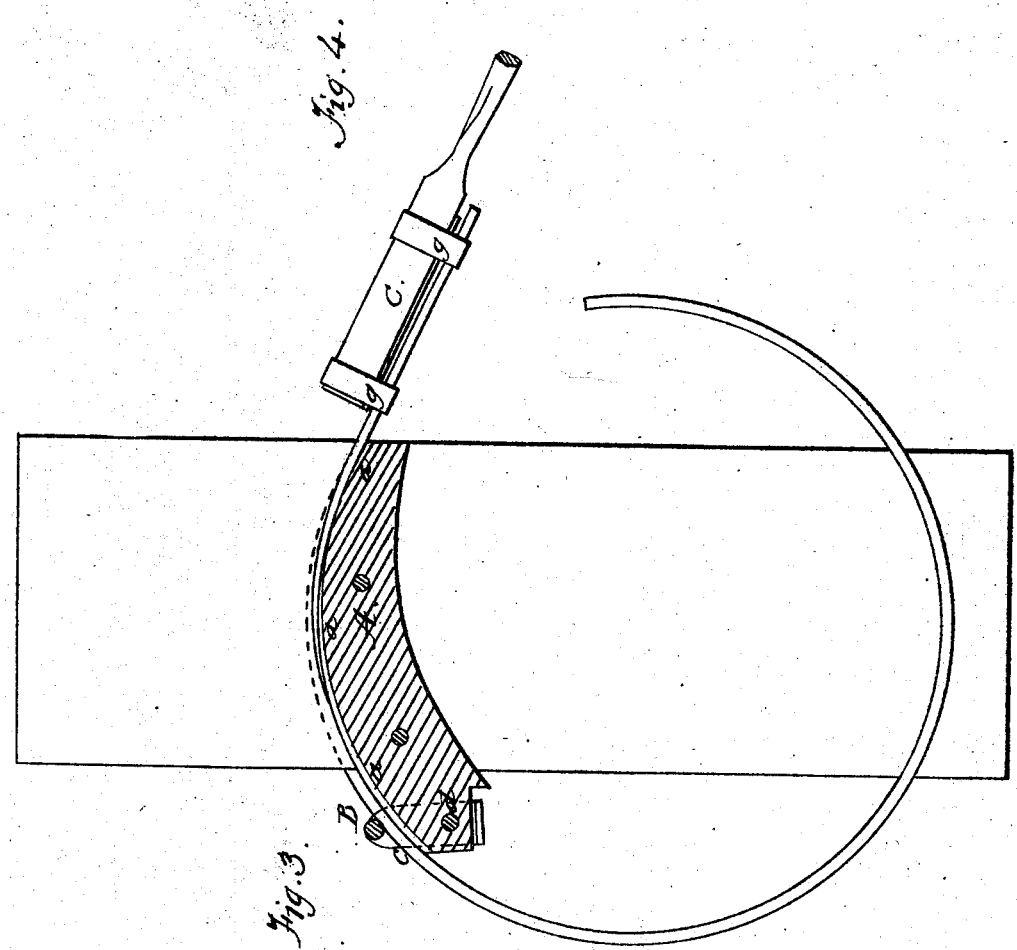

United States Patent Office.

JACOB NAYLOR, OF HEDGESVILLE, WEST VIRGINIA.

Letters Patent No. 75,781, dated March 24, 1868.

---

IMPROVED MACHINE FOR BENDING TIRES.

---

The Schedule referred to in these Letters Patent and making part of the same.

---

TO ALL WHOM IT MAY CONCERN:

Be it known that I, JACOB NAYLOR, of Hedgesville, in the county of Berkeley, and State of West Virginia, have invented a new and improved Tire-Bender; and I do hereby declare that the following is a full, clear, and exact description thereof, reference being had to the accompanying drawings, making a part of this specification, in which—

Figure 3 is a vertical section of the device, showing the hand-lever applied to the last end of a tire that is being bent.

Figure 4 is an end view of the device.

Similar letters of reference indicate corresponding parts in the several figures.

Figures 1, 2:
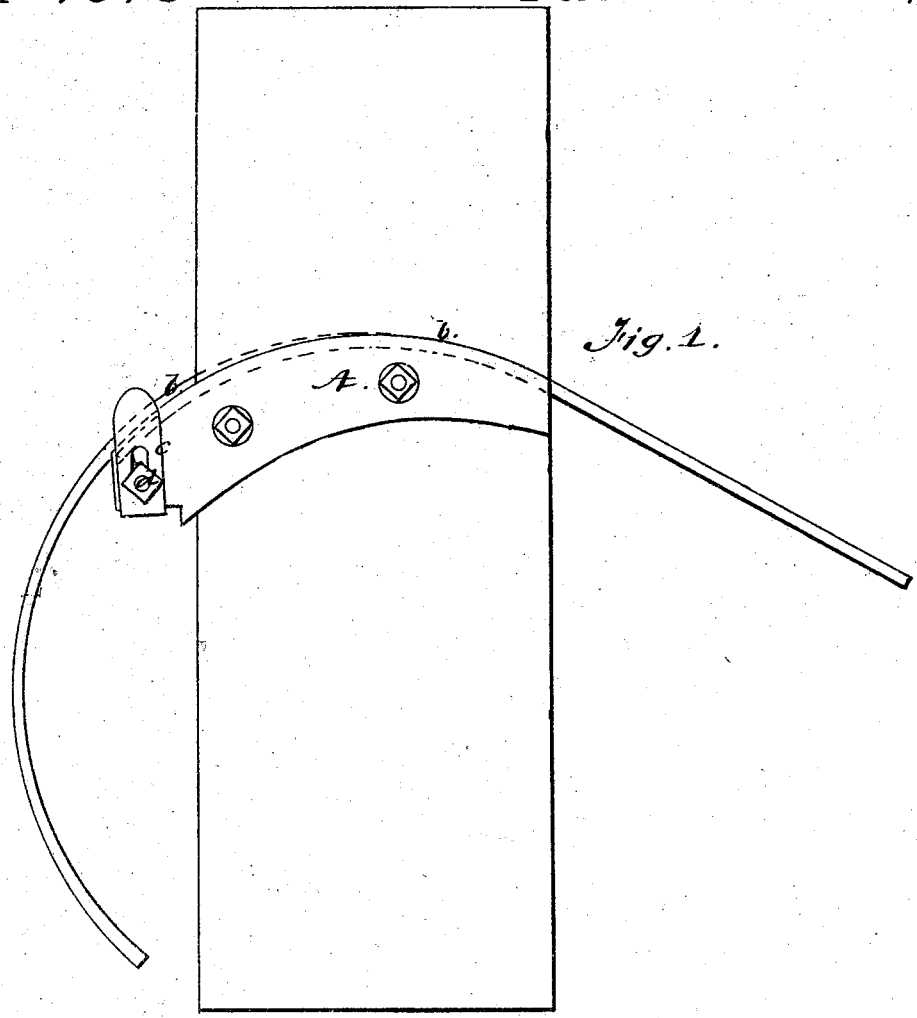
Figure 1 is an elevation of the improved device.
Figure 2 is a top view of the device.

This invention relates to a new and improved machine which is adapted for use in the operation of bending iron for making tires for wheels.

The nature of my invention consists in the employment of a flanged segmental block or former, which is provided with a horizontal transverse bridge, arranged over it, near one end, which bridge is so applied that it can be adjusted and set for different diameters and thicknesses of tires, as will be hereinafter described.

It also consists in the use, in conjunction with a segmental former and holding-down bridge, of a hand-lever, which is provided with loops on one end for receiving a portion of a tire, and affording a leverage and a means of holding the tire while completing the operation of bending, as will be hereinafter described.

To enable others skilled in the art to understand my invention, I will describe its construction and operation.

In the accompanying drawings, A represents a solid metal block or former, the upper surface $a$ of which is the arc of a circle, which is of less diameter than the smallest tire required to be bent upon it, for reasons which will be hereinafter explained. This block or former A is provided with flanges $b\ b$ on the sides of its convex face $a$, which serve as guides and abutments for a tire during the operation of bending it, so as to prevent the tire from being bent while lying obliquely upon the former. The flanges $b$ will indicate to the eye of the operator when a tire is in proper position upon the former A to be bent. At or near one end of the block A is a bridge-bar, B, which is cylindrical, and constructed with standards $c\ c$ upon its ends. These standards, with their bar B, are secured firmly to the block A, by means of a horizontal transverse bolt, $d$, which passes through oblong slots made through the standards. The oblong slots are made through the standards, as stated, for the purpose of allowing the bar B to be adjusted and set at any required distance from the surface $a$ of the former, A. This adjustment can be effected by loosening the clamping-nut on the end of bolt $d$. The same result may be obtained by making the hole through the former, A, oblong, or by making a number of holes through the standards $c\ c$, one above the other, for receiving the bolt $d$. The bar B should be parallel to the surface of the former-block, taken transversely, and its distance from said surface will depend upon the diameter of the tire required to be bent upon the block.

The machine thus described should be secured firmly to a post or other established object, at a proper height to allow the tire to work beneath it during the operation of bending; and when thus arranged and sustained it is ready for use.

The operation of bending is performed by introducing one end of the flat tire-bar between the face $a$ of the block A and the bar B, as shown in figs. 1 and 3. The operator then uses the tire-bar as a lever for bending it, and as each bend is given, the bar is slipped along over the surface of the former-block. When the straight portion of the tire-bar becomes so short as to fail to serve as a lever, I employ a lever, C, consisting of a long bar, having loops $g\ g$ applied to it near one end, so as to receive the end of the tire-bar, as shown in fig. 3. With this lever C the operation of bending the tire-bar can be completed.

By reference to fig. 3 it will be seen that the bending of the metal is done upon the front portion of the surface $a$ of the former-block, and rests upon that portion of the block which is beneath the bar B. This bar B is the holding-down bar, for resisting the upward tendency of the tire during the operation of bending it, and it is made adjustable, so as to adapt the machine for bending tires of different diameters. It should be understood that the tire is not bent so as to conform to the shape or arc of the surface *a*, for in this case all tires bent upon one block would be of the same diameter. The block serves as the anvil or object to bend the tires upon, but the exact curves to be given to the tires is determined by the operator.

If desirable, an adjustable stop may be applied to the front end of the block, for enabling an unpractised hand to work with facility at the machine; but, with very little practice, such a stop will not be required. When such a stop is employed it is set for a given radius of tire, and the operator brings the tire down upon it at every bending motion.

With a machine constructed as I have above described, tires can be bent with great facility, and with sufficient exactness to answer all practical purposes, and the work can be performed without heating the tire-rods.

I do not claim a former and a holding-down device broadly, as shown in the patents granted to William Hinds, March 7, 1833, A. Whitcomb, August 21, 1839, and to J. Klepper, July 30, 1861; but What I do claim as my invention, and desire to secure by Letters Patent, is—

A former, A, provided with flanges *b b* and adjustable stirrups for holding the bar B, all constructed, arranged, and combined as described.

JACOB NAYLOR.

Witnesses:
 JEREMIAH GWIN,
 GEORGE F. KREGTON.